(12) United States Patent
Seo et al.

(10) Patent No.: US 7,720,034 B2
(45) Date of Patent: May 18, 2010

(54) METHOD FOR TRANSMITTING AND RECEIVING A SIGNAL TO PROTECT AGAINST ERRONEOUS FEEDBACK INFORMATION

(75) Inventors: Dong Youn Seo, Seoul (KR); Bong Hoe Kim, Gyeonggi-do (KR); Young Woo Yun, Seoul (KR); Ki Jun Kim, Seoul (KR); Jung Hoon Lee, Seoul (KR); Eun Sun Kim, Seoul (KR); Hak Seong Kim, Seoul (KR); Suk Hyon Yoon, Seoul (KR); Joon Kui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 313 days.

(21) Appl. No.: 11/840,867

(22) Filed: Aug. 17, 2007

(65) Prior Publication Data

US 2008/0089297 A1   Apr. 17, 2008

(30) Foreign Application Priority Data

Aug. 18, 2006   (KR) ...................... 10-2006-0078416

(51) Int. Cl.
  *H04L 12/50*   (2006.01)
  *H04B 7/00*   (2006.01)
(52) U.S. Cl. ........................ 370/336; 370/334; 455/522
(58) Field of Classification Search .............. 455/67.16, 455/69, 101, 522; 370/207, 334, 336; 375/295
See application file for complete search history.

(56) References Cited

U.S. PATENT DOCUMENTS

| 6,563,807 | B1 * | 5/2003 | Kim et al. | 370/331 |
| 2003/0148738 | A1 * | 8/2003 | Das et al. | 455/67.5 |
| 2003/0181170 | A1 | 9/2003 | Sim | |
| 2005/0219999 | A1 * | 10/2005 | Kim et al. | 370/207 |
| 2006/0039328 | A1 | 2/2006 | Ihm et al. | |

FOREIGN PATENT DOCUMENTS

KR   1020060012825   2/2006

OTHER PUBLICATIONS

RAN1, "LS on Rel-7 MIMO Conclusions", 3GPP TSG-RAN1 Meeting #45, May 8, 2006, R1-061636, XP050102474.

* cited by examiner

*Primary Examiner*—George Eng
*Assistant Examiner*—Nizar Sivji
(74) *Attorney, Agent, or Firm*—Lee, Hong, Degerman, Kang & Waimey

(57) ABSTRACT

A method for providing precoding weights for data symbols of data control subframes includes generating a downlink frame having control subframes which individually correspond to one of a plurality of downlink data subframes, and inserting weight information into each of the control subframes, such that the weight information is to be applied to data symbols present in the corresponding one of the data subframes. The method further includes transmitting the control subframes and the inserted weight information to a receiving device.

10 Claims, 6 Drawing Sheets

METHOD FOR TRANSMITTING AND RECEIVING A SIGNAL TO PROTECT AGAINST ERRONEOUS FEEDBACK INFORMATION

CROSS-REFERENCE TO RELATED APPLICATIONS

Pursuant to 35 U.S.C. § 119(a), this application claims the benefit of earlier filing date and right of priority to Korean Application No. 10-2006-0078416, filed on Aug. 18, 2006, the contents of which are hereby incorporated by reference herein in their entirety.

FIELD OF THE INVENTION

The present invention relates generally to wireless communication systems, and in particular, to a method for providing precoding weights for data symbols of data control subframes.

DISCUSSION OF THE RELATED ART

A transmit antenna array (TxAA) is a presently available scheme that is used to achieve transmit diversity. Examples of such schemes are disclosed in standards materials developed according to the 3rd Generation Partnership Project (3GPP). One TxAA scheme is applied to a dedicated physical channel (DPCH) and a high speed downlink shared channel (HS-DSCH). A dual-stream TxAA technology is commonly considered a multiple-input multiple-output (MIMO) transmission technique for the HS-DSCH.

A typical dual-stream TxAA scheme is a closed loop technology which uses two transmission antennas, multiplies the signal of a transmission entity by a weight received from a reception entity, and transmits the multiplied resultant signal in an effort to improve system performance.

If the channel environment between a base station and associated user equipment (UE) is of sufficient quality, a dual-stream TxAA technology may be used to add a single stream to a conventional TxAA transmission to increase the data transfer rate. Such an arrangement multiples the single transmission stream by a new weight which is orthogonal to the conventional weight, and then transmits the multiplied result.

FIG. 1 is a block diagram depicting a typical TxAA transmission/reception configuration implementing two antennas. In particular, this figure depicts a TxAA mode-1 system which detects a reception (Rx) signal using a detection unit contained in the receiving entity, and extracts data from the Rx signal. A weight generation unit is shown calculating weights (w1 and w2) to maximize a signal-to-noise ratio (SNR) of the Rx signal. The calculated weights are subsequently transmitted to a transmitting entity.

The transmitting entity multiples the weights (w1 and w2) by the transmission (Tx) signal, transmits the weight (w1) to a first antenna, and transmits the weight (w2) to a second antenna. If two Rx antennas are provided, Rx signals (r1 and r2) of the two individual antennas of the receiving entity may be represented by the following equations:

$$r_1 = (w_1 h_{11} + w_2 h_{12})s + n_1$$

$$r_2 = (w_1 h_{21} + w_2 h_{22})s + n_2$$

In these equations, s refers to a data symbol, $h_{ij}$ refers to the channel response transmitted from the j-th Tx antenna to the i-th Rx antenna, $w_j$ refers to weight multiplied by the j-th antenna, and $n_1$ and $n_2$ refer to additive white Gaussian noise (AWGN) contained in each Rx signal.

Data symbol recovery of the TxAA mode-1 system may be accomplished using the following equation:

$$\hat{s} = (w_1 h_{11} + w_2 h_{12})^* r_1 + (w_1 h_{21} + w_2 h_{22})^* r_2$$

An exemplary technique for calculating the weight includes using an Eigen vector associated with a maximum Eigen value of a covariance matrix of a channel, as represented by the following equation:

$$Rw = \lambda w$$

In this above equation, R relates to a covariance matrix of the channel.

A typical TxAA Mode-1 system utilizes a weight vector in the form of a single bit, feeds back the weight vector, and allows only phase information of a single bit to be fed back to each slot without including power information.

This Mode-1 system includes a pilot symbol of a downlink dedicated physical control channel (DPCCH), and transmits several orthogonal pilot symbols to each of the two antennas. The UE then performs channel estimation of the two Tx antennas in slot units using a common pilot channel (CPICH) of each antenna, calculates weights $w_1$ and $w_2$ of the transmitting entity, and transmits phase and power control information of each antenna to the base station.

A typically configured universal mobile telecommunications system (UMTS) terrestrial radio access network (UT-RAN) analyzes reception (Rx) information according to the following table:

| Slot # | 0 | 1    | 2    | 3     | 4    | 5     | 6    | 7     | 8    | 9     | 10   | 11    | 12   | 13    | 14   |
|--------|---|------|------|-------|------|-------|------|-------|------|-------|------|-------|------|-------|------|
| FSM    | 0 | 0    | π/2  | 0     | π/2  | 0     | π/2  | 0     | π/2  | 0     | π/2  | 0     | π/2  | 0     | π/2  | 0 |
|        | 1 | π    | −π/2 | π     | −π/2 | π     | −π/2 | π     | −π/2 | π     | −π/2 | π     | −π/2 | π     | −π/2 | π |

This technique for analyzing the Rx information employs one-bit information using a constellation rotation to diversify the Rx signal, such that at least four weights are used. For instance, weight ($w_1$) of a first antenna is a fixed value denoted by the following:

$$\omega_1 = \frac{1}{\sqrt{2}}$$

Weight ($w_2$) of a second antenna can be calculated, in conjunction with Table 1, using the following:

$$w_2 = \frac{\sum_{i=n-1}^{n} \cos(\Phi_i)}{2} + j \cdot \frac{\sum_{i=n-1}^{n} \sin(\Phi_i)}{2}$$

Weight ($w_2$) of the second antenna can be calculated by the value ($\Phi_1$), which corresponds to the feedback phase information of each slot.

Note that a slight modification typically occurs at the edge of the frame. In order to adjust the phase of Slot 0, for example, the information of slot 13 of a previous frame is used instead of slot 14 of the previous frame. This is because the previous frame is used to acquire an average value on the basis of specific values (0, π) and (π/2,−π/2). A technique for calculating the average value includes the use of the following equation.

$$w_2 = \frac{\cos(\Phi_{13}^{j-1}) + \cos(\Phi_0^j)}{2} + j \cdot \frac{\sin(\Phi_{13}^{j-1}) + \sin(\Phi_0^j)}{2}$$

In the above equation, $\Phi_0^i$ refers to a phase-adjusting command fed back to slot 0 of a current frame, and $\Phi_{13}^{j-1}$ refers to a phase-adjusting command fed back to slot 13 of a previous frame.

Since there is typically no feedback information before an initial step, the initial value may be set to:

$$\omega_1 = \frac{(1+j)}{\sqrt{2}}$$

Accordingly, after the lapse of the feedback operation, the following equation may be used:

$$w_2 = \frac{\cos(\pi/2) + \cos(\Phi_1)}{2} + j \cdot \frac{\sin(\pi/2) + \sin(\Phi_0)}{2}$$

As another example, a dual-stream TxAA scheme will now be described. Typically, a code reuse scheme for transmitting two streams for a single orthogonal variable spreading factor (OVSF) code has been applied to the HS-DSCH of a WCDMA system, such that greater amounts of data can be sent over the HS-DSCH. For this purpose, a conventional TxAA scheme is extended to a dual-stream TxAA scheme. In general, the dual-stream TxAA scheme applies a conventional weight to a first stream, and applies another weight, orthogonal to the conventional weight, to a second stream.

FIG. 2 is a block diagram depicting a typical dual-stream TxAA transmitting entity implementing two antennas. In this figure, the transmitting entity performs demultiplexing of information bits, such that the information bits are divided to form of a dual stream. Encoding, channel interleaving, and modulation are then applied to each of the streams.

A corresponding weight is then multiplied by data transmitted via each antenna, and the multiplied result is then transmitted. As an example, weights ($v_{11}$ and $v_{21}$) of the first stream are equal to those of the conventional TxAA scheme, and orthogonal weights ($v_{12}$ and $v_{22}$) of the second stream are applied to the second stream, such that it is not necessary to change or add a routine which feed backs the weight selected by the UE to the base station (i.e., Node-B).

The TxAA system feeds back the selected weight to the Node-B, such that the Node-B creates and uses the weight on the basis of the received information. However, the Node-B is typically unable to recognize whether a feedback information failure occurs. Therefore, if such a failure does occur, the TxAA system may use a distorted weight.

In such a scenario, the UE may decode data using an original weight having been fed back, but the TxAA system is unable to receive corresponding data due to a difference between the weight of the Node-B and the weight of the UE. Therefore, the TxAA system will typically determine the presence or absence of the feedback information failure, and also decode data using the same weight as the distorted weight used by the Node-B, such that the system can receive desired data even though system performance may be slightly deteriorated.

Accordingly, the UE will typically require a specific method for determining whether the Node-B uses a normal weight or an erroneous weight. To accomplish this, an antenna verification procedure may be implemented which utilizes a common pilot and a dedicated pilot. This technique includes applying weight to the dedicated pilot, but not the common pilot. An example of such an antenna verification scheme is disclosed in Appendix A of 3GPP TS 25.214 V4.4.0 (2002-3).

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for providing preceding weights for data symbols of data control subframes includes generating a downlink frame having control subframes which individually correspond to one of a plurality of downlink data subframes, and inserting weight information into each of the control subframes, such that the weight information is to be applied to data symbols present in the corresponding one of the plurality of data subframes. The method further includes transmitting the control subframes and the inserted weight information to a receiving device.

In an aspect, each of the control subframes comprise a first portion and a second portion, and the method further includes inserting the weight information into the first portion of each of the control subframes.

In an aspect, each of the control subframes is defined by a single slot, and the second portion of each of the control subframes is defined by at least two slots which follow the single slot.

In an aspect, each of the control subframes is arranged to border data symbols present in the corresponding one of the plurality of data subframes.

In an aspect, each of the control subframes comprise a plurality of consecutive slots, such that the weight information is inserted in a first slot of the consecutive slots.

In an aspect, the method further includes inserting the weight information into only one of a plurality of slots which define each of the control subframes.

In an aspect, each of the data subframes comprise high speed physical data shared channel (HS-PDSCH) subframes and each of the control subframes comprise high speed shared control channel (HS-SCCH) subframes.

In an aspect, the receiving device is configured as user equipment.

In an aspect, the downlink frame is generated by a Node B operating within a wireless communication system.

In an aspect, the method further includes transmitting the weight information in a slot which precedes a slot used to transmit data in the corresponding data subframe.

In accordance with an alternative embodiment, a method for receiving precoding weights applied to data symbols of data control subframes includes receiving a plurality of data subframes, and receiving a downlink frame, which includes control subframes that individually correspond to one of the plurality of data subframes. The method further includes identifying weight information in each of the control subframes, and applying the weight information for each of the control subframes to corresponding data subframes of the plurality of data subframes.

In accordance with another alternative embodiment, a transmitting entity operable in a wireless communication system and configured to provide precoding weights for data symbols of data control subframes includes a processor configured to generate a downlink frame having control subframes which individually correspond to one of a plurality of downlink data subframes, and insert weight information into each of the control subframes, such that the weight information is to be applied to data symbols present in the corresponding one of the plurality of data subframes. The transmitting entity further includes a transmitter configured to transmit the control subframes and the inserted weight information to a receiving device.

In accordance with yet another alternative embodiment, a portable device for receiving precoding weights applied to data symbols of data control subframes includes a receiver configured to receive a plurality of data subframes, receive a downlink frame having control subframes which individually correspond to one of the plurality of data subframes. The portable device further includes a processor configured to identify weight information in each of the control subframes, and apply the weight information for each of the control subframes to corresponding data subframes of the plurality of data subframes.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

First of all, various embodiments will be described in the context of a downlink frame structure formed in accordance with the requirements set out in the 3GPP WCDMA standards, but such embodiments are not limited to such standards and other techniques may be used for the frame structure. In addition, the terms "Node-B" and "UE" will be used to refer to particular types of signal transmitters and signal receivers, respectively. However, a Node-B may be implemented using other devices which can transmit downlink signals, and the UE may be implemented using other devices which can receive such downlink signals.

In an embodiment, a method is provided for transmitting feedforward information. In this embodiment, consider the scenario in which an unexpected failure occurs in weight information that is fed back from the UE to the Node-B. In this system, several transmission/reception (Tx/Rx) antennas transmit a data stream using a weight for each Tx antenna. The Node-B informs the UE of the failure, such that the UE can effectively decode data even though this failure has occurred in the feedback weight information.

To accomplish this, the Node-B feeds back information to the UE (this action will also be referred to as feedforward). In this case, the feedback information includes weight information to be multiplied by data transmitted via each antenna.

To implement the above-noted operation, a downlink feedforward signal message (D-FSM) field may be assigned to a downlink dedicated channel (e.g., DL-DPCH or F-DPCH) and a high-speed downlink shared control channel (e.g., HS-SCCH). Also, the D-FSM field may be assigned to an additional downlink dedicated channel (e.g., a downlink dedicated feedforward signal message channel (DL-DFSMCH)) and a downlink shared control channel (e.g., a downlink common feedforward signal message channel (DL-CF-SMCH)). Various techniques for increasing signal Tx/Rx accuracy by transmitting feedforward information over a variety of channels will now be described.

Figure 1:
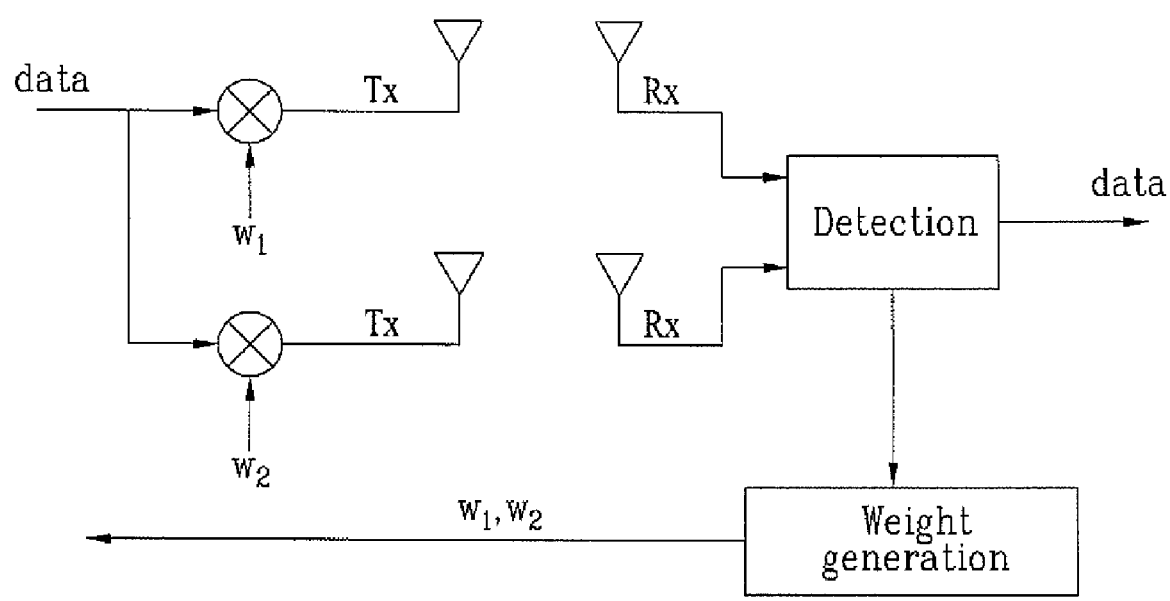
FIG. 1 is a block diagram depicting a typical TxAA transmission/reception configuration implementing two antennas.
Figure 2:
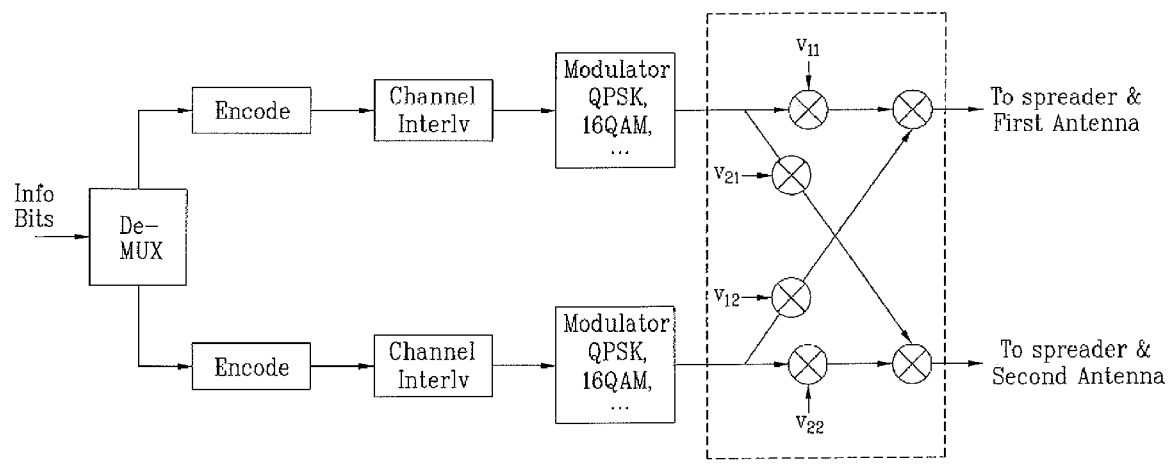
FIG. 2 is a block diagram depicting a typical dual-stream TxAA transmitting entity implementing two antennas.
Figure 3:
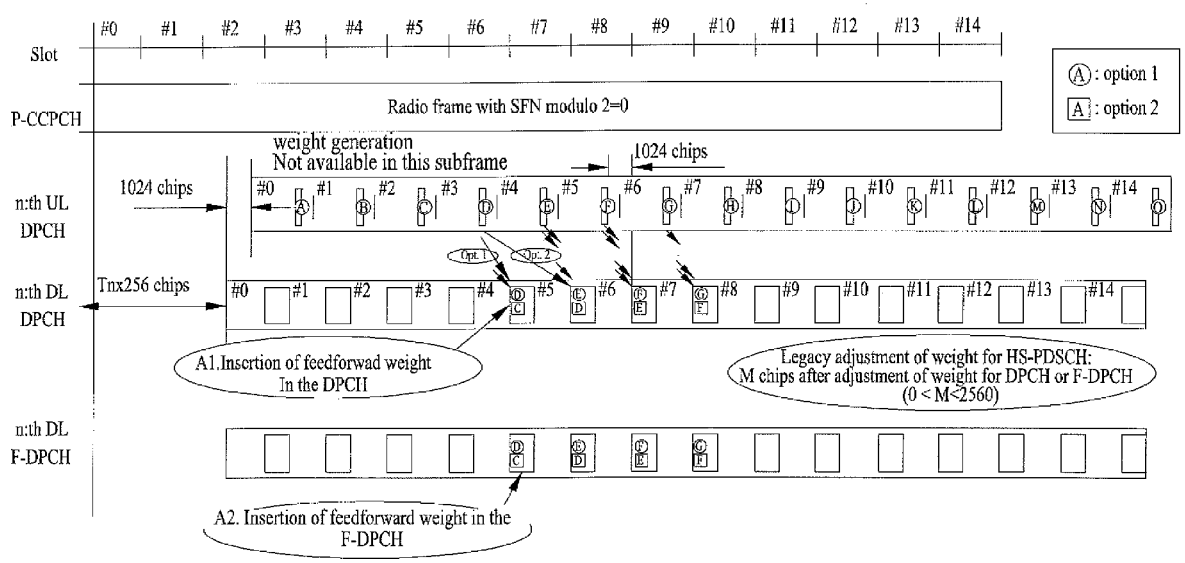
FIG. 3 depicts a method for transmitting feedforward information over a downlink dedicated channel according to an embodiment of the present invention.

FIG. 3 depicts a method for transmitting feedforward information over a downlink dedicated channel according to an embodiment of the present invention. This figure depicts a downlink DPCH, and in particular, the nth DL DPCH, and an uplink DPCH, and in particular, the nth UL DPCH. As an example, the uplink DPCH is spaced apart from the beginning point of the downlink DPCH by a predetermined distance corresponding to 1024 chips. A primary common control physical channel (P-CCPCH) is used as a reference for the timing relationship between channels. Note that the P-CCPCH may also be indicative of a timing point at which data of the common pilot channel (CPICH) is transmitted.

According to an embodiment, the UE generates an optimum weight using the above-noted downlink CPICH. The UE also generates a feedback signaling message (FSM) bit according to the Mode-1 scheme, and transmits the FSM bit to the Node-B. The one-bit FSM bit is transmitted to the Node-B at a specific time corresponding to about 70%-80% of each slot of the uplink DPCH. Thereafter, the Node-B receives the FSM, and readjusts the weight of a beginning portion of each slot pilot field, instead of the edge of the downlink DPCH slot. Note that this pilot field occupies about 60%-100%, or in some cases, 99%-100%, of each slot of the uplink DPCH. The just-noted portion of the slots is represented in FIG. 3 using by a small-sized box of each slot of the DL DPCH.

When weight information is fed back to the Node-B over on the uplink, a weight can be applied to data which is to be transmitted from the Node-B. Therefore, because of the propagation delay between the downlink and the uplink, a considerable time interval is typically arranged between the end point of the FSM field of the uplink DPCH and the start point of the downlink pilot field.

The time interval is typically set to a specific time corresponding to a minimum of 1024 chips. Therefore, the start point of the downlink pilot field corresponds to a specific point of about 60%-100% of the downlink DPCH in consideration of the above-mentioned 1024 chips. Note that the timing relationship between slot 5 of the uplink DPCH and slot 6 of the downlink DPCH is disclosed for illustrative purposes only.

When the UE generates a weight and feeds back the weight, the Node-B may apply the weight to predetermined points according to either of two methods, which will be referred to herein as Option-1 and Option-2. According to Option-1, the FSM transmitted to the i-th slot of the uplink DPCH is applied to a corresponding time point of the downlink (i+1)-th slot. In other words, as shown in FIG. 3, the FSM information (E) applied to slot 4 of the uplink DPCH is applied to slot 5 of the downlink DPCH. The Option-1 technique will typically consider only 1024 chips because of the propagation delay from the uplink to the downlink. If the Option-1 technique generates the weight according to the Mode-1 scheme described above, the Mode-1 scheme is characterized in such a manner that the weight is created by a combination between previous reception information D and current reception information E.

Option-2 typically assigns an additional spare time to the above-mentioned minimum propagation delay, such that it applies the FSM transmitted to the i-th slot to the time point of a downlink (i+2)-th slot. Option-1 is shown in an upper part of FIG. 3, and Option-2 is shown in a lower part of FIG. 3.

Another technique which will now be described allows the Node-B to transmit an actually-used weight to the UE regardless of the presence or absence of an error or failure according to the above-mentioned timing relationship. A first consideration includes various techniques for including a downlink feedforward signaling message (D-FSM information in a conventional downlink DPCH or fractional dedicated physical channel (F-DPCH)), and transmitting the resultant information.

As shown in "A1" and "A2" of FIG. 3, a first method includes the D-FSM field in the downlink DPCH, and transmits the FSM bit received from the UE at intervals of a predetermined slot using the D-FSM field. As a result, the bit mapping structure of the conventional DPCH is different from that of the F-DPCH slot. However, since each of the two channels is used as a user dedicated channel, a newly-configured channel is only used by users utilizing two channels such that there is no influence in conventional users, thus resulting in a lack of backward compatibility.

In this case, the Node-B may recognize the weight after transmitting the FSM of the uplink DPCH according to the conventional timing diagram including a propagation delay, such that the D-FSM field location is set to a specific time at which feedback information transmission and 1024 chips are considered. The specific time is typically at about 60%-100% of the downlink slot.

The weight received from the UE is applied to different time points using, for example, Option-1 or Option-2, such that the FSM for a corresponding slot is transmitted according to individual options. In other words, according to Option-1 as shown in FIG. 3, the feedforward information contained in slots 4-7 of the DL DPCH are set to reception (Rx) feedforward information D, E, F, and G respectively received via slots 3-6 of the UP DPCH.

According to Option-2, feedforward information contained in slots 4-7 of the DL DPCH are set to Rx feedforward information C, D, E, and F respectively received via the slots 2-5 of the UP DPCH. Therefore, the feedforward information of the Option-2 technique is spaced apart by the slots of the Option-1 technique by a predetermined distance of one slot.

If the UE receives the above-noted feedforward information, it decodes Rx data using weights acquired via this information received from the Node-B, instead of using feedback information received in the UE itself. Accordingly, although the Node-B erroneously receives feedback information of the UE so that an undesired weight is multiplied by the feedback information, the UE can acquire weights actually multiplied by each data, and decodes the data using the acquired weights, resulting in the implementation of stable data reception.

Figure 4:
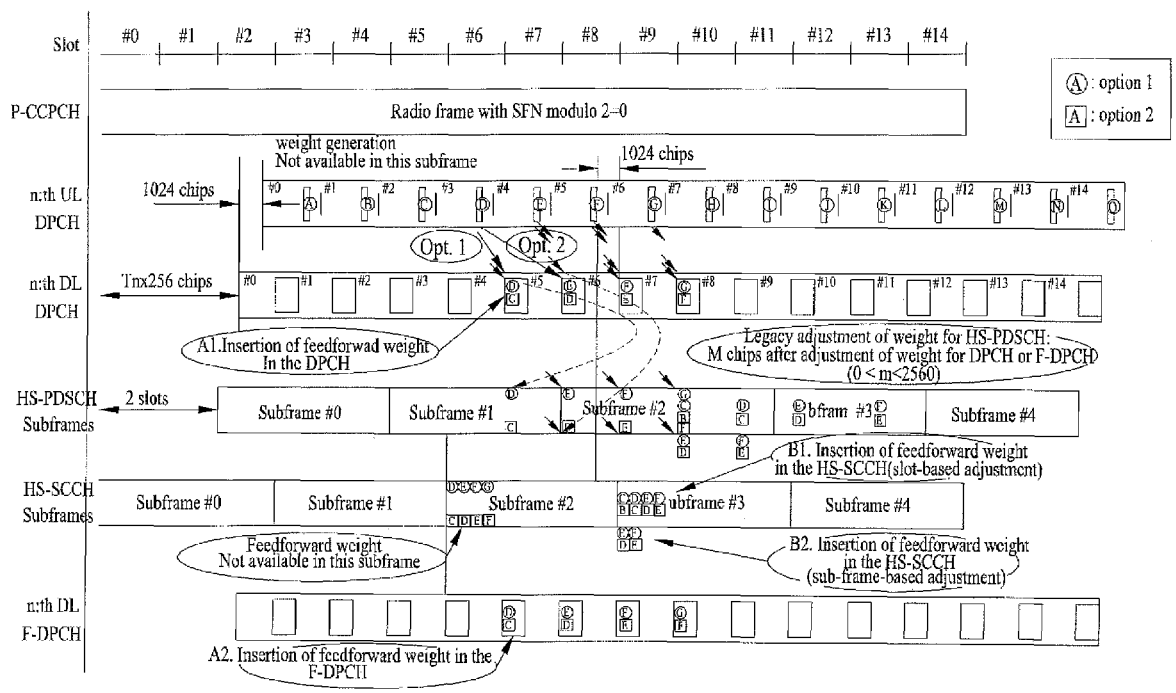
FIG. 4 depicts a method for transmitting/receiving feedforward information via the HS-SCCH according to an embodiment of the present invention.

FIG. 4 depicts a method for transmitting/receiving the above-described feedforward information via the HS-SCCH according to an embodiment of the present invention, and will now be described. In particular, a timing relationship between the HS-SCCH and the HS-PDSCH, which are used as downlink shared channels, will also be described with reference to FIG. 4.

If the HS-PDSCH is established, the weight may be applied to the HS-PDSCH in the same or similar manner as in the downlink DPCH or F-DPCH.

If weight information is applied to the HS-PDSCH in slot units, the weight is typically readjusted to the edge of the HS-PDSCH slot. The HS-PDSCH slot edge may be different from the start point of the pilot field indicating the weight resetting point of the downlink DPCH, such that the resetting of the HS-PDSCH weight may be performed after the lapse of a predetermined time corresponding to M chips on the basis of the pilot start point of the downlink DPCH.

FIG. 4 also illustrates the coincidence of the weight resetting time point, and in particular, the exemplary case of M=0. This figure depicts three slots of the HS-PDSCH as being formed from a single sub-frame, and Mode-1 determining the weight of a current slot using a previous FSM and a current FSM. In the case of transmitting a single sub-frame, the HS-PDSCH requires not only the FSM bit applied to the three slots of the corresponding sub-frame, but also another FSM bit information of the last slot of a previous sub-frame received as an initial value.

FIG. 4 also shows three slots of the HS-SCCH as being formed from a single sub-frame, which is similar to that of the HS-PDSCH. If each UE monitors four HS-SCCH channels and at the same time recognizes that one of the four HS-SCCH channels is assigned to the UE itself, the UE recognizes the HS-PDSCH on the basis of information of the corresponding channel, and decodes data of the HS-PDSCH.

In this case, when the HS-SCCH recognizes a channel assigned to the HS-SCCH itself and data of the HS-PDSCH is decoded, an unexpected time delay may occur. Due to the time delay, the HS-SCCH is transmitted earlier than the HS-PDSCH by two slots. The DPCH and the F-DPCH transmit independent data fields in slot units, such that they may determine data to be transmitted prior to a transmission time of a corresponding field, regardless of the slot edge or frame edge.

In a manner which is different than the DPCH and F-DPCH, the HS-SCCH is channel-coded by two parts, and is then transmitted in sub-frame units such that it must determine all the information to be transmitted prior to the transmission time.

Referring still to FIG. 4, if a conventional weight application time is applied to the HS-PDSCH sub-frame 2 (i.e., if the user desires to apply E, F, and G information according to Option-1 and desires to transmit the D-FSM over the SH-SCCH), the feedforward information D of the previous slot of the E information should be contained in the HS-SCCH sub-frame 2 such that D, E, F, and G information are transmitted to the HS-SCCH sub-frame 2. However, the D, E, F, and G information are not received in the Node-B in an uplink direction before a current time reaches the start point of the HS-SCCH sub-frame 2. Therefore, the D-FSM which includes the D, E, F, and G information cannot be transmitted over the HS-SCCH. According to an embodiment, an additional time delay is added to a propagation delay time required for receiving feedback information via the uplink, such that the resultant data is transmitted as feedforward information.

The above-described additional time delay considers that the HS-SCCH performs transmission of sub-frame units in a manner which differs from the dedicated channel (e.g., DPCH). Due to the additional time delay, the feedforward information can be transmitted over the conventional HS-SCCH, resulting in the reduction of the number of unexpected errors capable of being generated when the above-mentioned timing relationship is disregarded.

In a manner similar to the HS-SCCH sub-frame 3, weight information C, D, E, and F received prior to the transmission time is transmitted via the D-FSM field of the HS-SCCH sub-frame 3, and weight information applied to the HS-PDSCH sub-frame 3 are set to the values C, D, E, and F, such that an additional time delay can be assigned to the conventional weight application time.

If the weight applied to the HS-PDSCH is compared with the HS-PDSCH, which does not use conventional feedforward information, a time of two slots is typically delayed as in Option-2, and a time of three slots is typically delayed as in Option-1, such that the feedforward information can be properly transmitted.

Terms "delay" and "time delay" will be considered in the context of the specific case of M=0, for example, and where the conventional HS-PDSCH includes only 1024 chips corresponding to a minimum propagation delay. However, if M=0, such that the DL DPCH and the HS-PDSCH have the same timing point, an additional delay may be assigned to the timing point on the basis of the DL DPCH. This additional delay can minimize a specific time corresponding to the sum of two slots and one slot. The HS-SCCH is typically located prior to the HS-PDSCH by two slots.

The feedforward information D, capable of being applied to a third slot of the HS-PDSCH sub-frame 2, is inserted into sub-frame 3 indicating that the next sub-frame of the HS-SCCH is arranged at a location delayed by the two slots. According to Mode-1, feedforward information of a previous slot is included such that it uses the additional delay of one slot. Although this additional delay is indicative of a minimum delay required for transmitting the feedforward information via the HS-SCCH, the scope of the actual delay is not a requirement and may be established using different techniques.

If the propagation delay becomes longer because of channel conditions, for example, and information C, D, E, and F cannot be transmitted to the HS-SCCH sub-frame 3 (i.e., if only B, C, D, and E can be transmitted to the HS-SCCH sub-frame 3), the weight applied to the HS-PDSCH may be delayed by four slots according to Option-1, or delayed by three slots according to Option-2. In such a scenario, provided that the weight is created by a previously-received FSM and a current FSM according to Option-1, the FSM corresponding to three slots contained in a single sub-frame of the HS-PDSCH will include three information units, and information transmitted to the D-FSM will include the FSM information of the last slot of the previous sub-frame in order to implement the initial value.

The embodiment of FIG. 4 includes the value D which corresponds to the weight of the last slot of the previous sub-frame although only E, F, and G data units are transmitted to the HS-PDSCH sub-frame 2, such that D, E, F, and G data units are transmitted to the destination. Such an embodiment relates to a specific case for applying the weight in slot units. However, situations in which collected feedback information capable of being received after transmitting the feedforward information may unavoidably assign a considerably long delay to the optimum weight setting time point and its application time point. The channel capable of using MIMO may have low channel variation, such that the weight applied to each slot slightly affects the performance improvement. In this case, the transmission of the D-FSM information of four bits may encounter potentially significant overhead.

Another embodiment includes not applying feedforward information in slot units, and instead applying such information in sub-frame units to prevent or minimize the above-noted delay and reduce overhead. When using weight application to sub-frame units, the weight applied to the first of three slots may be equally applied to the remaining three slots.

The Mode-2 technique uses information of a previous slot and FSM bit information of a current slot, such that there is a need to transmit two-bit information. For instance, the weight can be applied to the HS-PDSCH sub-frame 3 using the last FSM bits (E and F) received prior to the start point of the HS-SCCH sub-frame 3. In this case, the weight applied to the HS-PDSCH generates a delay of 1 slot in Option-1, and may not generate such a delay in Option-2.

The delay of this embodiment is shown under the condition of a minimum delay. If a propagation delay becomes longer due to channel conditions, and E and F information cannot be transmitted to the HS-SCCH sub-frame 3 (i.e., if only D and E information can be transmitted to the HS-SCCH sub-frame 3), the weight applied to the HS-PDSCH may generate a delay of two slots in Option-1, or may generate a delay of one slot in Option-2.

Yet another embodiment includes assigning a code channel capable of transmitting the D-FSM, and using orthogonal variable spreading factor (OVSF) code resources, whenever downlink resources become exhausted. This example can maintain a conventional channel without any change.

Figure 5:
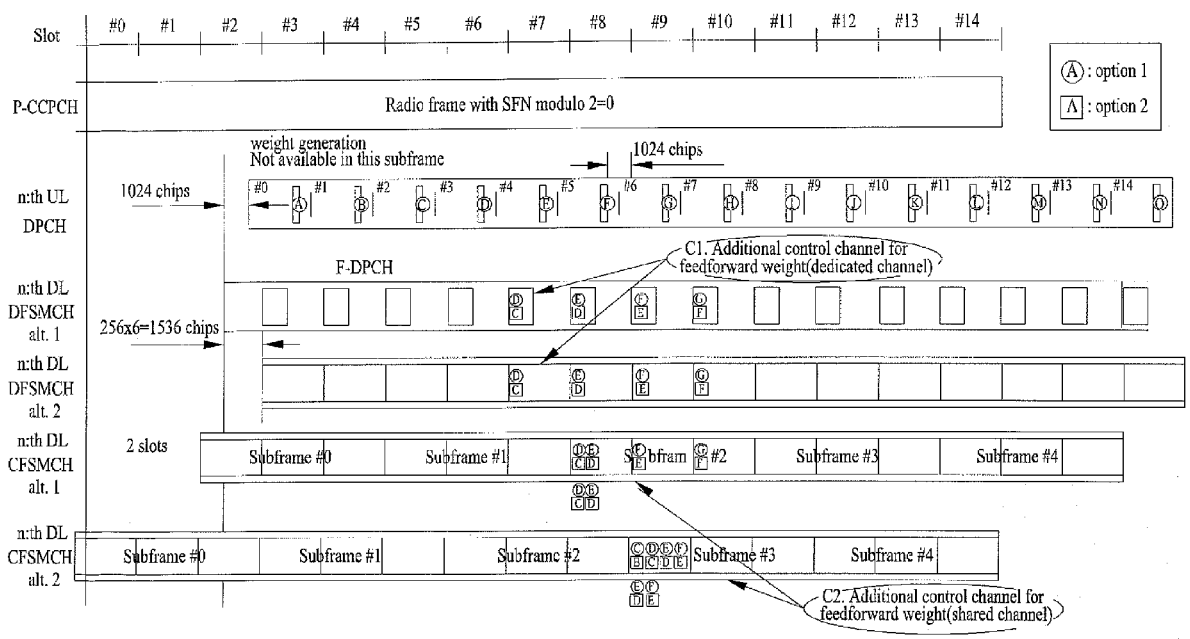
FIG. 5 depicts a dedicated feedforward signaling message channel (DFSMCH) which may be assigned to a dedicated channel for transmitting the D-FSM.

FIG. 5 depicts a dedicated feedforward signaling message channel (DFSMCH) which may be assigned to a dedicated channel for transmitting the D-FSM, as denoted by "C1." This method is similar to the above-described method for including D-FSM information in the downlink DPCH channel or the F-DPCH channel, and then transmitting the resultant information.

According to the timing relationship associated with the downlink DPCH, the D-FSM field is assigned to some or all of 60%-100% of each slot. In other words, compared with the embodiment of FIG. 3 showing that the D-FSM information is transmitted via the DL DPCH, the embodiment of FIG. 5 substitutes the newly-defined DFSMCH for the DL DPCH in a manner that is different than shown in FIG. 3. The other portions of FIG. 5 are substantially the same as that which is shown and described in conjunction with FIG. 3.

In yet another embodiment, an offset corresponding to (256×6) chips may be assigned to the downlink DPCH, and the D-FSM field may be assigned to some or all of a corresponding slot. Therefore, feedforward information applied to each slot can be equally applied to portions from the edge of the slot. The D-FSM information transmitted to each slot may be equal to the FSM used for a corresponding downlink DPCH according to the Options 1 and 2.

As indicated by item C2 of FIG. 5, a new shared channel for transmitting the D-FSM information may be defined and transmitted as necessary. The newly-defined channel is denoted by a common feedforward signaling message channel (CFSMCH), and this method is similar to the method for loading the D-FSM information on the HS-SCCH and transmitting the resultant information.

According to this embodiment, data is transmitted according to the sub-frame structure, such that a current channel can be used as a shared channel. Provided that only one FSM information is independently transmitted to each slot via the conventional shared channel, the three-slot and one-subframe structure is not satisfied due to the application problem of an initial value. Also, if all of the D-FSM are coded to be appropriate for a single sub-frame, a delay may be assigned to the weight of the HS-PDSCH. To solve these situations, a technique may be used which independently transmits the FSM to each slot simultaneously while maintaining the sub-frame structure.

The FSM of the last slot time of the previous sub-frame is transmitted to the first slot along with another FSM of the first slot time. In other words, the first slot of sub-frame 1 includes feedforward information corresponding to two slots, and only feedforward information corresponding to one slot is inserted into the remaining slots of the corresponding sub-frame.

A method for applying the weight of the HS-PDSCH to the HS-PDSCH at the highest speed will now be described. As shown by the arrows of FIG. 3, in order to apply D, E, F, and G values according to Option-1 in consideration of only 1024 chips, the CFSMCH should be adjusted to be later than the HS-SCCH transmission timing point by a predetermined period of two slots, such as that which is shown in FIG. 5. According to Option-2, C, D, E, and F values are used.

In this case, the D-FSM information transmitted to each slot transmits the FSM used for the downlink DPCH and a value prior to M chips (where $0 \leq M \leq 2560$, and FIG. 3 shows the case of M=0). In other words, if the user desires to transmit data acquired when E, F, and G weights are applied to the HS-PDSCH sub-frame 2, the sub-frame 3 of the "CFSMCH alt. 1" may transmit D, E, F, and G feedforward information to three slots. The HS-SCCH may be earlier than the HS-PDSCH by a specific time of two slots, such that it can pre-notify the fact that data transmitted by the UE via the HS-PDSCH is transmitted to the HS-SCCH itself. However, there is no requirement that the CFSMCH inform which one of the UEs will receive data via the HS-PDSCH such that data can be transmitted along with the sub-frame of the corresponding HS-PDSCH sub-frame.

In this embodiment, the number of bits of the first, second, and third slots, are different from each other. In order to acquire the same decoding performance from all the bits, an amount of information may be increased, such that the transmission (Tx) power of the first slot may be increased by the increased amount of information.

If desired, the weight may be applied in frame units instead of using slot units. A typical procedure includes assigning a delay to a weight application time by including D-FSM information in the HS-SCCH. However, one aspect of the present invention utilizes the same weight as that of a conventional HS-PDSCH. In other words, the weight applied to the first slot of the HS-PDSCH sub-frame may also be applied to the remaining two slots. Therefore, there is no requirement for the DL CFSMCH to transmit the FSM information to the second and third slots.

According the above-described embodiment, the DL SCF-SMCH transmits 1-bit FSM information applied to the previous sub-frame, and 1-bit FSM information to be applied to a current sub-frame to slot 1, such that a total of two bits are transmitted to slot 1.

In FIG. 5, Option-1 includes feedforward information (D and E) of recently-received two slots to the first slot in sub-frame 3 of the "DL CFSMCH alt. 1," and Option-2 includes C and D information. According to Option-1, feedforward information D is applied to the last slot of the previous sub-frame interval of sub-frame 3 and feedforward information E is applied to the first slot of the current sub-frame. According to Option-2, the feedforward information C is applied to the last slot of the previous sub-frame interval of sub-frame 3 and feedforward information D is applied to the first slot of the current sub-frame.

A method for establishing synchronization with the HS-SCCH and loading the D-FSM on the HS-SCCH according to an embodiment will now be described. The D-FSM to be transmitted is channel-encoded in frame units, and transmits a corresponding weight to the same point as that of the HS-SCCH. CFSMCH transmission is completed prior to the start point of the HS-PDSCH, such that the weight information can also be applied at the start point of the HS-PDSCH reception as may be necessary.

If desired, the weight may be applied in sub-frame units, as will now be described. Mode-1 uses previous slot information and FSM bit information of a current slot, such that it requires transmission of 2-bit information. If Mode-1 is applied to the HS-PDSCH sub-frame 3, then weight is applied using E and F values indicating the last FSM bits received prior to the start point of the HS-SCCH sub-frame 3. In this case, the weight applied to the HS-PDSCH generates a delay shorter than that of Option-1 by a predetermined time of one slot, and does not generate a delay according to Option-2.

If the propagation delay increases according to channel conditions, so that E and F values are not transmitted to the HS-SCCH sub-frame 3 (i.e., if only the D and E values can be transmitted to the HS-SCCH sub-frame 3), the weight applied to the HS-PDSCH is delayed by two slots in Option-1, and delayed by one slot in Option-2.

Figure 6:
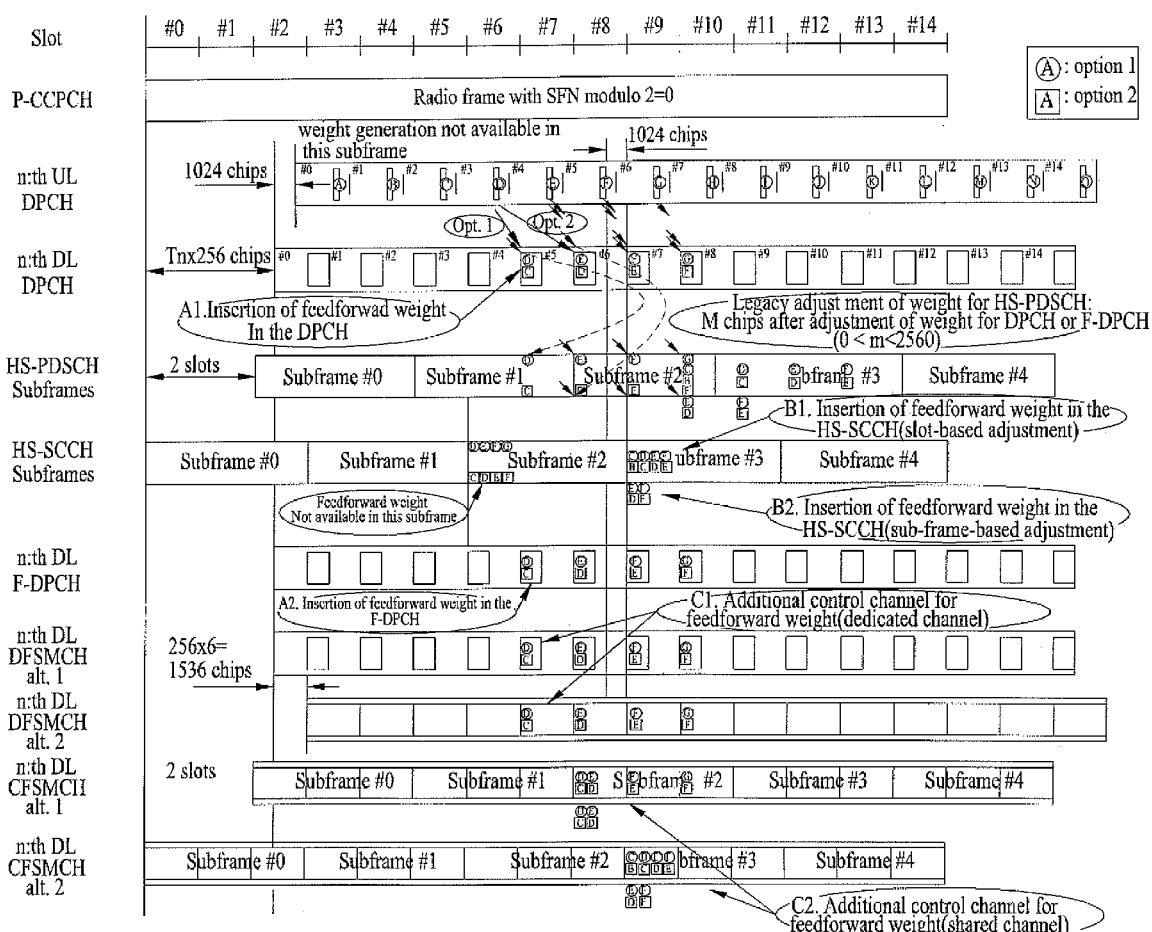
FIG. 6 depicts an overall timing relationship of the various schemes of FIGS. 3-5.

FIG. 6 depicts an overall timing relationship of the various schemes of FIGS. 3-5. If the feedforward information is transmitted over a conventional dedicated channel (e.g., DL-DPCH and DL-F-DPCH of FIGS. 3 and 6), the channel will typically need to be resent in consideration of the relationship associated with a corresponding UE. If feedforward information is transmitted using a shared channel such as the HS-SCCH shown in FIGS. 4 and 6, it may assign an additional delay to data. To solve the additional delay problem, the weight may be applied in sub-frame units instead of using slot units.

FIGS. 5 and 6 depict DL DFSMCH alt. 1, DL DFSMCH alt.2, DCFSMCH alt. 1, and DL CFSMCH alt. 2 such that if a new channel for D-FSM information is established, an additional OVSF code may be assigned. If the UE receives feedforward information according to the above-described embodiments, the UE decodes Rx data using weights acquired from the Node-B via feedforward information received over a variety of channels, instead of its own feedback information. Although an undesired weight is multiplied by data because the Node-B receives erroneous feedback information from the UE, the UE can acquire information of weights actually multiplied by each data, and decodes the data using the acquired weight information, resulting in the implementation of stable data reception.

The Node-B can transmit weight information used for actual data transmission to the UE such that the UE can stably receive Tx data from the Node-B. A minimum delay is typically assigned to the transmission of feedforward information for transmitting weight information in the case of using conventional dedicated and shared channels, such that the feedforward information can also be accurately transmitted over conventional channels. The feedforward information can also be transmitted over newly-defined dedicated- and shared-channels, such that a time delay can be shorter than that of conventional channels.

In addition, the weight information may be transmitted in sub-frame units such that it can reduce overhead required for transmitting feedforward information under a low channel variation, and can minimize delay required for transmitting the feedforward information.

Although the present invention may be implemented using the exemplary series of operations described herein, additional or fewer operations may be performed. Moreover, it is to be understood that the order of operations shown and described is merely exemplary and that no single order of operation is required.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for transmitting signals at a base station to a user equipment (UE) configured to operate in a multi input multi output (MIMO) mode, the method comprising:
   receiving, from the UE, feedback information comprising weight information to be used for data transmission;
   multiplying a weight and data to be transmitted, the weight being determined considering to the feedback information received from the UE;
   transmitting the weight multiplied data to the UE through a specific physical downlink shared channel where a MIMO transmission scheme for a HS-DSCH (High Speed Downlink Shared Channel) is applied; and
   transmitting feed-forward information, indicating the weight applied to the data when transmitted to the UE, through a downlink shared control channel when the data is transmitted using the MIMO transmission scheme for the HS-DSCH,
   wherein the weight applied to the specific physical downlink shared channel is adjusted at a subframe boundary of the downlink shared control channel, and
   wherein the feed-forward information, comprising the weight information indicating the weight applied to a specific subframe of the specific physical downlink shared channel, is transmitted through a subframe of the downlink shared control channel corresponding to the specific subframe of the specific physical downlink shared channel.

2. The method according to claim 1, wherein the feed-forward information transmitted through one subframe of the downlink shared control channel comprises the weight information applied to 2 slots of the specific physical downlink shared channel received right before the one subframe.

3. The method according to claim 1, wherein the downlink shared control channel is newly defined channel for transmitting the feed-forward information.

4. The method according to claim 1, wherein a UE configured in a closed-loop transmit diversity mode 1 performs an antenna verification to receive the data from the base station.

5. The method according to claim 1, wherein the MIMO transmission scheme for the HS-DSCH comprises a dual stream transmission scheme.

6. The method according to claim 5, wherein the data is transmitted through a first stream and a second stream, and each of the first and the second streams is transmitted through two antennas.

7. A method for receiving signals at a user equipment (UE) configured to operate in a multi input multi output (MIMO) mode, the method comprising:
   transmitting, to a base station, feedback information comprising weight information, the feedback information generated at the UL based on a received pilot signal;
   receiving data, to which a weight is applied, from the base station through a specific physical downlink shared channel where a MIMO transmission scheme for a HS-DSCH (High Speed Downlink Shared Channel) is applied; and
   receiving feed-forward information indicating the weight applied to the data at the base station when the data is received using the MIMO transmission scheme for the HS-DSCH,
   wherein the weight is adjusted at a subframe boundary of the specific physical downlink shared channel, and
   wherein the feed-forward information, comprising the weight information indicating the weight applied to a specific subframe of the specific physical downlink shared channel, is received through a subframe in a downlink shared control channel corresponding to the specific subframe of the specific physical downlink shared channel.

8. The method according to claim 7, wherein a UE configured in a closed-loop transmit diversity mode 1 performs an antenna verification to receive the data from the base station.

9. The method according to claim 8, wherein the MIMO transmission scheme for the HS-DSCH comprises a dual stream transmission scheme.

10. The method according to claim 9, wherein the data is received through a first stream and a second stream, and each of the first and the second streams is received through two antennas.

* * * * *